Jan. 17, 1956   W. C. ROWE   2,731,060
STAIN-RESISTANT BARRIER
Filed April 8, 1952

INVENTOR.
WALTER CURTIS ROWE
BY Ely, Frye & Hamilton
ATTORNEYS

United States Patent Office 2,731,060
Patented Jan. 17, 1956

2,731,060

STAIN-RESISTANT BARRIER

Walter Curtis Rowe, Akron, Ohio, assignor to The Firestone Tire & Rubber Company, Akron, Ohio, a corporation of Ohio Application April 8, 1952, Serial No. 281,100

14 Claims. (Cl. 152—330)

This invention relates to the prevention of staining in light-colored rubber objects, and more particularly, to the prevention of staining which occurs in the white sidewall of a tire, due to the migration of pigments from compounds used in other portions of the tire.

In the compounding of the many rubber stocks used throughout the body in the manufacture of a black sidewall tire, there is no problem of subsequent discoloration of the sidewall, and therefore no precautions need be taken in this regard. Thus, high percentages of reclaimed rubber may be compounded into the body with the resulting advantage of reduced cost and an improvement in factory processing of the stock used. Likewise, the selection of oils and softeners used in all-black tire body stocks is not limited by the problem of staining characteristics, and therefore the wide range of ordinary softeners known to the rubber industry is available for use in such tires. The same is true in the case of antioxidants. On the other hand, in the case of white sidewall tires, these materials have a tendency to migrate and discolor the lighter sidewall stock.

In the present handling of body stocks in a tire factory, much time and effort is consumed in segregating non-staining stocks for the white sidewall tire from the stocks suitable only for black sidewall tires. Obviously, it would be economical if the same body stock could be used for both black and white sidewall tires, because of the elimination of special handling and simplification of inventory, and generally improved economy in production.

In order to accomplish the construction of a white sidewall tire of the quality to remain white for the entire period of the tire life, it has been necessary for the manufacturer to choose carefully oils, carbon blacks, and antioxidants which are non-staining and to eliminate altogether the use of reclaims in the body stocks. This is a costly but, heretofore necessary incident.

It is impractical to use the standard body of a black tire in the construction of a convention white sidewall tire because of the staining characteristics of many of the pigments found in the black tire body. If a white sidewall were superimposed on an uncured black tire body in place of the black sidewall, and the tire cured in the conventional manner, in a very short time the white sidewall would turn a yellowish brown and eventually would become almost black from the migration of the staining pigments present in the various oils, reclaims, and antioxidants compounded in the black tire body. This result defeats the purpose of the white sidewall tire which is to supply a decorative, spotless, white accessory for the driving public.

It is, therefore, an object of this invention to provide a rubbery composition impervious to the migration of staining pigments and thus not subject to staining. It is also an object of this invention to provide a tire with a light-colored sidewall which is resistant to pigment migration. Another object is to provide a rubbery composition having non-staining characteristics together with greatly improved resistance to weather-checking and sun-checking. Another object is to supply a migration-impervious barrier between a light-colored stock and a stock compounded with staining pigments in order to protect the light-colored stock from discoloration. A further object is to provide a non-staining barrier between the body and the sidewall of a white sidewall tire.

Further objects will become apparent as the nature of the invention is further disclosed.

By the use of the rubbery composition of this invention in articles such as the white sidewalls of tires, the advantages of using the ordinary compounding ingredients of the black tire construction have been retained in the construction of a white sidewall body.

This is accomplished by using a composition impervious to migration of staining pigments. The composition is used either in the white sidewall itself or in a barrier between the staining body and white sidewall. The composition is compounded from a vinyl polymer blended with a rubbery copolymer of an acrylonitrile with an open-chain conjugated diolefin, with modifying pigments added in various proportions.

Figure 1:
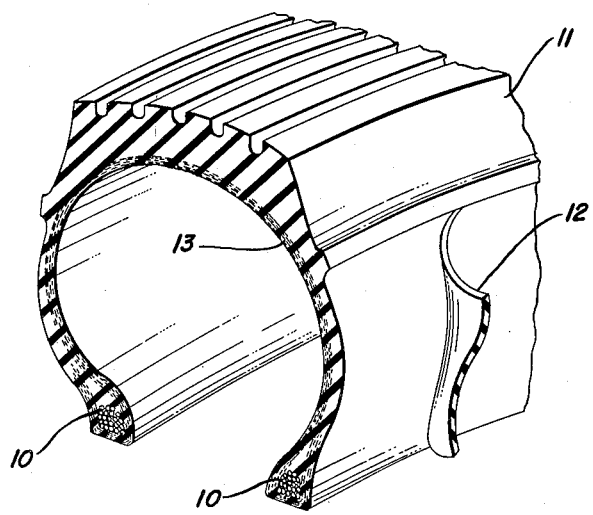
Figure 1 is a perspective view partly in section of a black sidewall tire which embodies a white sidewall of the novel composition.

In reference to Figure 1, the beads 10, tread 11, and fabric plies 13 make up the component parts of a standard tire body. According to the invention the plies 13 are compounded with a high percentage of reclaim and ordinary oils, as well as any suitable antioxidant, whether non-staining or staining. This is the construction of a typical black tire body. Upon this standard body is bonded a white sidewall 12 which is compounded from the novel composition hereinafter described. The tire construction as disclosed is in all respects similar to the conventional black sidewall tire, the only difference being the use of the novel white sidewall stock cured thereto. Although this disclosure will describe in detail the use of the invention in a white sidewall tire, it is not to be considered as limited thereto, but said composition may be satisfactorily used alone or in combination with any other molded, calendered, or extruded items to attain a non-staining, improved aging, light-colored product.

In the manufacture of a tire embodying one modification of the invention, the body is built up from successive plies of rubber coated fabric. The bead portions 10 are applied in the conventional manner, and the edges of the rubber coated fabric are turned up and down around the beads to hold them securely. The tread portion 11 is then laid on the fabric in the conventional manner and is firmly stitched down to insure good adhesion. The novel, non-staining, migration-resistant white sidewall, formed by extrusion or calendering in strips is then cemented to the body.

For the cement used in bonding the novel sidewall to the tire body, a number of different types are available. Of these, two are preferable. One comprises a blend of a rubbery copolymer of a conjugated diolefin and an acrylonitrile and resorcinol-formaldehyde resin dissolved in a mixture of a ketone and an aromatic solvent. The other cement comprises chlorinated rubber dissolved in a mixture of an aromatic solvent and ethyl acetate. Other cements suitable for this purpose are well known to those familiar with the art of cement bonding of rubbery materials.

Figure 2:
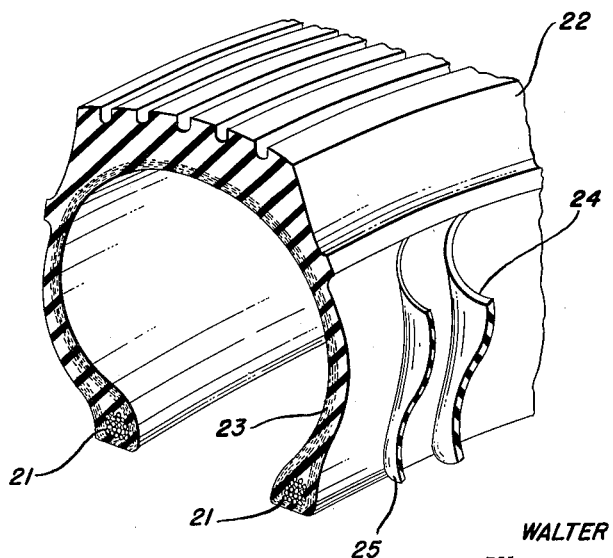
Figure 2 is a perspective view partly in section of a black sidewall tire showing the use of a barrier of the novel composition between the body and white sidewall portions.

In reference to Figure 2, the beads 21, tread 22, rubberized fabric body 23, and white sidewall 24 make up the component parts of a standard white sidewall tire. The rubber composition in the body 23 is normally compounded with non-staining pigments, but it is to the permissible use of cheaper, more readily available pigments that this invention is directed. To accomplish this object, the migration-resistant barrier 25 is superimposed on body 23 to segregate it from the white sidewall 24, which latter is cemented to the barrier.

In the manufacture of this novel tire, the carcass is built up from successive plies of rubber-coated fabric, the bead portions 21 are applied, and the edges of the rubber-coated fabric are turned up and down around the beads to hold them securely, all in the conventional manner. The tread portion 22 is then laid on the fabric and firmly stitched down in order to get good adhesion. The novel, non-staining, migration-resistant barrier 14 is then cemented to the body. A coat of cement is applied to the barrier, and the white sidewall strip 24 is firmly stitched thereto.

The novel white sidewall or barrier is preferably comprised of a blend of a vinyl chloride polymer with a rubbery butadiene-acrylonitrile copolymer. It is also possible to use a blend of resinous vinyl chloride-vinyl acetate copolymer with butadiene-acrylonitrile copolymer. In place of butadiene in the rubbery copolymer, other open-chain, conjugated dienes may be used, such as piperylene, 2,3-dimethyl butadiene-1,3; 3-methyl pentadiene-1,3; 2-methyl-pentadiene-1,3; hexadiene-1,3, hexadiene-2,4; isoprene and others. In this invention the use of butadiene-1,3 and isoprene are preferred, but not to be deemed as limiting.

To this blend of polymers and copolymers are added a certain number of modifying or compounding ingredients, as for example, a plasticizer, a wax, coloring agents, such as ultra-marine blue and titanium dioxide, a reinforcing material, such as zinc oxide, sulfur, an accelerator, and a stabilizer.

For the acrylonitrile-butadiene portion of the blend, a range of acrylonitrile percentage varying from 15–60% is possible. Methacrylonitrile may be used in place of acrylonitrile. However, a range of acrylonitrile of from 25–40% by weight is preferred to attain the best results. The higher percentages of acrylonitrile lend stiffness to the blend and are more satisfactory for those uses of the invention wherein a high degree of flexibility is not necessary. Thus, in heavy-duty, light-colored pads and light-colored molded goods wherein flexibility is not a requirement, the invention operates satisfactorily with from 40–60% acrylonitrile and the balance of butadiene. However, in the case of a light sidewall tire, where greater flexing is essential, lower percentages of acrylonitrile, for instance 25–40%, preferably will be employed. A compound having this percentage range is easily worked in the factory, and is endowed with the desired resistance to pigment migration and staining.

As stated above, the vinyl resin portion of the blend preferably consists of polyvinyl chloride or a copolymer of vinyl chloride-vinyl acetate. Other vinyl polymers such as vinyl chloride-vinylidene chloride copolymers and vinyl chloride-trichlorethylene copolymers are acceptable, although not as desirable from cost and processing standpoints. Suitable compounds for copolymerization with vinyl chloride include, for instance, vinyl esters on the order of vinyl bromide, vinyl fluoride, vinyl acetate, vinyl chloroacetate, vinyl butyrate, other higher fatty and vinyl esters, vinyl alkyl sulfonates and the like; vinyl ethers such as vinyl ethyl ether, vinyl isopropyl ether and vinyl chloroethyl ether and the like; cyclic unsaturated compounds, such as styrene, the mono- and polychlorostyrenes, coumarone, indene, vinyl naphthalenes, vinyl pyridines, vinyl pyrrole and the like; acrylic acid and its derivatives, such as ethyl acrylate, methyl methacrylate, ethyl methacrylate, ethyl chloroacrylate, acrylonitrile, methacrylonitrile, diethyl maleate, diethyl fumarate and the like; vinylidene compounds on the order of vinylidene chloride, vinylidene bromide, vinylidene fluorochloride, and the like; unsaturated hydrocarbons, such as trichlorethylene, ethylene, propylene, isobutene and the like; allyl compounds, such as allyl acetate, allyl chloride, allyl ethyl ether and the like; and conjugated and cross-conjugated ethylenically unsaturated compounds, such as butadiene, isoprene, chloroprene, 2,3-dimethyl butadiene-1,3, piperylene, divinyl ketone and the like. For a fairly complete list of materials known to polymerize with vinyl chloride reference may be had to Krezil, "Kurzes Handbuch der Polymerization Technik, II, Mehrstoff Polymerisation," Edwards Bros. Inc., 1945, pp. 735–737, the items under "Vinyl chloride."

In blending the vinyl chloride polymer with the butadiene-acrylonitrile copolymer, percentages of vinyl chloride polymer of from 80–20% by weight combined with butadiene-acrylonitrile copolymer from 20–80% by weight of the copolymer have been found satisfactory. Stocks in this range have ideal resistance to migration of staining pigments, as well as a high resistance to sun checking and weather aging.

Mixing of the light-colored rubbery composition of this invention is accomplished either by breaking the polymer ingredients down on a mill so that they will soften and be compatible with the other pigments, or by mixing by the Banbury mixing method familiar to those skilled in the rubber working art. Sulfur and accelerators are added toward the end of the mix, but other ingredients can be added practically at will. Sufficient sulfur and accelerators are added to give the stock the curing characteristics necessary to cure at the same rate as the tire body and to give the degree of hardness and scuffing resistance desired in the final tire. The tire body and the novel white sidewall, together with the tread and beads, when cured, for example, at 25 minutes at 290° F. with standard curing equipment present in a tire factory, will attain a state of curing of approximately uniform level or of the level desired in any particular case.

EXAMPLE

The following formulas illustrate various stocks mentioned. Although these formulas are typical, they are given only as examples, and it is not intended that the scope of this invention be limited thereby. All parts are by weight.

*Black tire body compound*

| | Parts |
|---|---|
| Crude natural rubber | 67 |
| Reclaimed rubber | 60 |
| Plasticizer (oil) | 2 |
| Pine tar | 2 |
| Stearic acid | 1.5 |
| Burgundy pitch | 2 |
| Phenyl beta naphthylamine | 1 |
| Zinc oxide | 3 |
| Clay | 15 |
| Sulfur | 2.8 |
| Rubber vulcanization accelerator | .7 |
| | 157.0 |

*Non-staining barrier or non-staining white sidewall compound*

| | Parts |
|---|---|
| Butadiene-acrylonitrile polymer | 20–80 |
| Vinyl chloride polymer | 20–80 |
| Santocizer M-17 [1] | 50 |
| Titanium dioxide | 100 |
| Ultramarine blue | .20 |
| Wax | 2 |
| Stabilizer #3 [2] | .50 |
| Zinc oxide | 10 |
| Sulfur | 4.25 |
| Rubber vulcanization accelerator | 1.00 |

[1] A methylphthalylethyl glycolate plasticizer sold by Monsanto Chemical Company.
[2] A polymeric tin compound sold by Advance Solvents Chemical Corp.

*Stainable white sidewall compound*
(For use with barrier)

| | Parts |
|---|---|
| Crude pale crepe rubber | 100 |
| Pine oil | 1 |
| Stearic acid | 1 |
| Wax | 2 |
| Ultramarine blue | .25 |
| Zinc oxide | 5 |
| White filler pigments | 25 |
| Sulfur | 3.25 |
| Accelerator | 1.5 |
| | 214.00 |

Although one form of the invention has been illustrated by way of example, and one method of carrying the same out in practice described, it will be apparent to those skilled in the art that many variations thereof are possible. I do not, therefore, wish to be limited to the precise embodiment or composition shown, or the method disclosed but only by the prior art and by the spirit of the appended claims.

What is claimed is:

1. In a white sidewall tire, in combination, a tread, a body portion which would normally stain the sidewall, bead portions, and a non-staining, weather-resistant, white sidewall portion, said white sidewall portion comprised of a blend of a vinyl resin polymer with a rubbery copolymer of a nitrile of an alpha-beta unsaturated organic acid having a straight chain consisting of three carbon atoms and an open-chain conjugated diolefin.

2. In a white sidewall tire, in combination, a tread, a body portion which would normally stain the sidewall, bead portions, and a non-staining, weather-resistant, white sidewall portion, said white sidewall portion comprised of a blend of 20–80% by weight of a polymer selected from the group consisting of polyvinyl chloride and vinyl chloride-vinyl acetate copolymer with 80–20% by weight of a copolymer of acrylonitrile with an open-chain conjugated diene.

3. In a white sidewall tire, in combination, a tread, a body portion containing migratory, stain-producing material, bead portions, and a non-staining, weather-resistant, white sidewall portions, said white sidewall portion comprised of a blend of 20–80% by weight of a copolymer of acrylonitrile with an open-chain conjugated diene with 80–20% by weight of a polymer selected from the group consisting of vinyl chloride-vinyl acetate copolymer and polyvinyl chloride, said acrylonitrile-diene copolymer comprising from 15–60% by weight of acrylonitrile and 85–40% by weight of an open-chain conjugated diene.

4. In a white sidewall tire, in combination, a tread, a body portion containing migratory, stain-producing material, bead portions, and a non-staining, weather-resistant, white sidewall portion, said white sidewall portion comprised of a blend of 20–80% by weight of a polymer selected from the group consisting of vinyl chloride and vinyl-chloride-vinyl acetate copolymer with 80–20% by weight of a copolymer of acrylonitrile with butadiene, said acrylonitrile-butadiene copolymer comprising from 15–60% by weight acrylonitrile and 85–40% by weight butadiene.

5. In a light-colored sidewall tire, the combination of a rubber-fabric carcass containing migratory, stain-producing material, a staining light-colored sidewall, and a non-staining barrier sheet impervious to migration of staining materials separating said sidewall from said carcass, said barrier comprising a blend of a vinyl polymer and a rubbery copolymer of an open-chain conjugated diene with a nitrile of an alpha-beta unsaturated organic acid having a straight chain consisting of three carbon atoms, the barrier sheet bonded to the carcass and sidewall.

6. In a light-colored sidewall tire, the combination of a rubber-fabric carcass containing migratory, stain-producing material, a staining light-colored sidewall, and a non-staining barrier sheet impervious to migration of staining materials separating said sidewall from said carcass, said barrier comprising a blend of from 20–80% of a polymer selected from the group consisting of vinyl chloride-vinyl acetate copolymer and polyvinyl chloride and from 80–20% by weight of a copolymer of an open-chain conjugated diene with acrylonitrile, the barrier sheet bonded to the carcass and sidewall.

7. In an article of manufacture, laminated layers of vulcanizable rubbery composition, the inner and outer layers normally color sensitive to migratory, stain-producing material, a portion intermediate the inner and outer layers comprising a rubbery compound impervious to migration of said staining material, said compound comprising from 20–80% by weight of a polymer selected from the group consisting of vinyl chloride-vinyl acetate copolymer and polyvinyl chloride and from 80–20% by weight of a copolymer of an open-chain conjugated diene with a nitrile of an alpha-beta, unsaturated organic acid having a straight chain consisting of three carbon atoms.

8. An unvulcanized vulcanizable article comprising opposed layers of rubber compositions normally pervious to migratory, stain-producing materials and a buffer layer disposed between said opposed layers comprising 20–80% by weight of a rubbery copolymer of an open-chain conjugated diene with acrylonitrile and from 80–20% by weight of a polymer selected from the group consisting of vinyl chloride-vinyl acetate copolymer and polyvinyl chloride, each of said compositions containing a vulcanizing agent therefor, all of said layers adhered together.

9. In an article of manufacture, laminated layers of vulcanizable rubbery composition, the inner and outer layers normally color sensitive to migratory, stain-producing materials, the portion intermediate the inner and outer portion comprised of a rubbery compound impervious to said staining material, said compound comprising from 20–80% by weight of a polymer selected from the group consisting of polyvinyl chloride and vinyl chloride-vinyl acetate copolymer and from 80–20% by weight of an open-chain conjugated diene copolymerized with acrylonitrile.

10. In an article of manufacture, laminated layers of vulcanizable rubber composition, the inner and outer layers normally color sensitive to migratory, stain-producing materials, the portion intermediate the inner and outer portions comprised of a rubbery compound impervious to said staining material, said compound comprising from 20–80% by weight of a polymer selected from the group consisting of a polyvinyl halide and a vinyl halide-vinyl acetate copolymer and from 80–20% by weight of an open-chain conjugated diene copolymerized with acrylonitrile.

11. In an article of manufacture, laminated layers of vulcanizable rubbery composition, the inner and outer layers normally color sensitive to migratory, stain-producing materials, the portion intermediate the inner and outer portions comprised of a rubbery compound impervious to said staining material, said compound comprising from 20–80% by weight of a polymer selected from the group consisting of a polyvinyl halide and vinyl halide-vinyl acetate copolymer and from 80–20% by weight of butadiene-1,3 copolymerized with acrylonitrile.

12. In an article of manufacture, laminated layers of vulcanizable rubbery composition, the inner and outer layers normally color sensitive to migratory, stain-producing materials, the portion intermediate the inner and outer portions comprised of a rubbery compound impervious to said staining material, said compound comprising from 20–80% by weight of a polymer selected from the group consisting of polyvinyl chloride and a vinyl chloride-vinyl acetate copolymer and from 80–20% by weight of butadiene-1,3 copolymerized with acrylonitrile, said butadiene-1,3 comprising 40–85% by weight of the butadiene-1,3 acrylonitrile copolymer.

13. In an article of manufacture, laminated layers of vulcanizable rubbery composition, the inner and outer layers normally color sensitive to migratory, stain-producing material, the portions intermediate said inner and outer portions comprised of a rubbery compound impervious to said staining material, said compound comprising from 20–80% by weight of a polymer selected from the group consisting of a polyvinyl halide and a vinyl halide-vinyl acetate copolymer and from 80–20% by weight of an open-chain conjugated diene copolymerized with acrylonitrile, said open-chain conjugated diene comprising 40–85% by weight of the diene-acrylonitrile copolymer.

14. In a white sidewall tire, in combination, a tread, a body portion which would normally stain the sidewall, bead portions, and a non-staining, weather-resistant, white sidewall portion, said white sidewall portion comprised of a blend of 20–80% by weight of a polymer selected from the group consisting of polyvinyl chloride and vinyl chloride-vinyl acetate copolymer with 80–20% by weight of a copolymer of methacrylonitrile with an open-chain conjugated diene.

References Cited in the file of this patent

UNITED STATES PATENTS

| | | |
|---|---|---|
| 2,240,856 | Phillips | May 6, 1941 |
| 2,330,353 | Henderson | Sept. 28, 1943 |
| 2,367,629 | Teppema et al. | Jan. 16, 1945 |
| 2,445,727 | Kinzinger et al. | July 20, 1948 |
| 2,566,328 | Hessney et al. | Sept. 4, 1951 |
| 2,566,329 | Hessney et al. | Sept. 4, 1951 |
| 2,574,893 | Signer | Nov. 13, 1951 |
| 2,653,884 | Hussey et al. | Sept. 29, 1953 |
| 2,669,535 | Orr | Feb. 16, 1954 |

OTHER REFERENCES

Pittenger et al.: Rubber Age, August 1947, pages 563–567.

Young et al.: Ind. Eng. Chem., February 1949, pages 401–408.